(No Model.)
C. E. TWITT.
FRICTION CLUTCH.
No. 505,617. Patented Sept. 26, 1893.
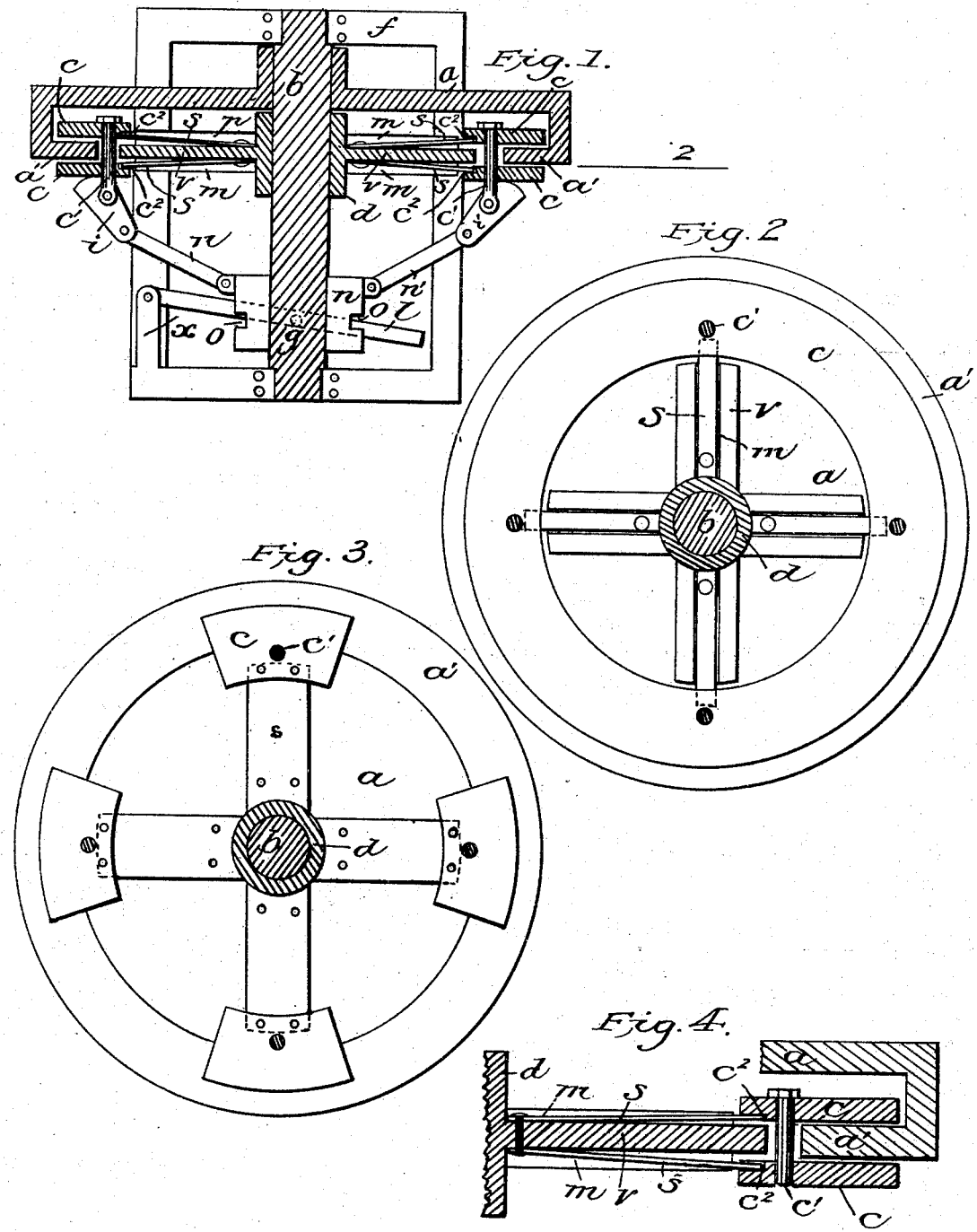
Witnesses
S. A. Trowbridge
C. M. Waller
Inventor
Charles E. Twitt
By Bradford Howland
Attorney

UNITED STATES PATENT OFFICE.

CHARLES E. TWITT, OF RAVENNA, OHIO, ASSIGNOR OF ONE-HALF TO STEPHEN A. TROWBRIDGE, OF SAME PLACE.

FRICTION-CLUTCH.

SPECIFICATION forming part of Letters Patent No. 505,617, dated September 26, 1893.

Application filed April 3, 1893. Serial No. 468,947. (No model.)

*To all whom it may concern:*

Be it known that I, CHARLES E. TWITT, a citizen of the United States, residing at Ravenna, in the county of Portage and State of Ohio, have invented a new and useful Improvement in Friction-Clutches, of which the following is a specification.

In the drawings forming a part hereof Figure 1 is a longitudinal section of the clutch. Fig. 2 is a vertical cross-section of the same at line 2 in Fig. 1. Fig. 3 is a similar section of the same in a modified form. Fig. 4 is an enlarged view in section of parts of the same.

Pulley $a$ is loose on shaft $b$ and formed with a concentric flange $a'$. Hub $d$ is keyed on shaft $b$ and formed with a radial flange or arm $v$. This flange is formed on its opposite sides with radial grooves $m$ to receive springs $s$ whose inner ends are attached to the flange and their outer ends connected with friction rings or grippers $c$. Flange $a'$ extends between rings $c$ which are supported by the outer ends of springs $s$.

It is preferable, but not essential that grippers $c$ should be rings, as there may be several of them on each side of flange $a'$ as in Fig. 3, and in that case springs $s$ should be attached to them firmly for their support. Grippers $c$ are operated to clutch flange $a'$ by means of bolt $c'$, cam $i$, link $n'$, sliding collar $n$, and lever $l$. Collar $n$ is feathered on shaft $b$ and is formed with an annular groove $o$ in which pins $g$ (indicated by dotted circle) project from lever $l$ which has a yoke-like form around the collar, and is hinged to arm $x$ on frame $f$. In sliding the collar toward pulley $a$ link $n'$ turns cam $i$ which presses against the outer gripper $c$ and draws bolt $c'$, thereby forcing both grippers firmly against the opposite sides of flange $a'$.

When the clutch is released by sliding back collar $n$, springs $s$ separate grippers $c$ from flange $a'$,—moving them to the position shown in the drawings. Grippers $c$ are formed with grooves $c^2$ to receive the outer ends of springs $s$ and allow them a slight endwise movement on the rings caused by the motion of the latter parallel to shaft $b$. The lateral strain on springs $s$ is sustained by the sides of grooves $m$ and $c^2$, and therefore it is preferable that flange $v$ should extend out near to grippers $c$. If springs $s$ are made strong enough to sustain the lateral strain on them, grooves $m$ may be dispensed with as in Fig. 3.

I claim as my invention—

1. In a friction clutch, the combination of a shaft; a loose pulley formed with a concentric flange; grippers at opposite sides of said flange; a radial flange rigidly connected with said shaft and formed with radial grooves; springs attached in said grooves and connecting with said grippers; and means for operating said grippers to clutch and release said pulley flange.

2. In a friction clutch, the combination of a shaft; a loose pulley formed with a flange at right angles to said shaft; friction rings formed with grooves at opposite sides of said pulley flange; a radial flange rigidly connected with said shaft and formed with radial grooves; springs attached in said grooves and extending into the grooves in said rings; and means for operating said rings to clutch and release said pulley flange.

3. The combination of shaft $b$, pulley $a$ formed with flange $a'$, grippers $c\ c$ at opposite sides of said flange; flange $v$; springs $s$ attached thereto and connected with and wholly supporting said grippers; and means for operating said grippers.

CHARLES E. TWITT.

Witnesses:
STEPHEN A. TROWBRIDGE,
BRADFORD HOWLAND.